(No Model.)
A. MALM.
PAPER CUTTING MACHINE.
No. 483,935. Patented Oct. 4, 1892.
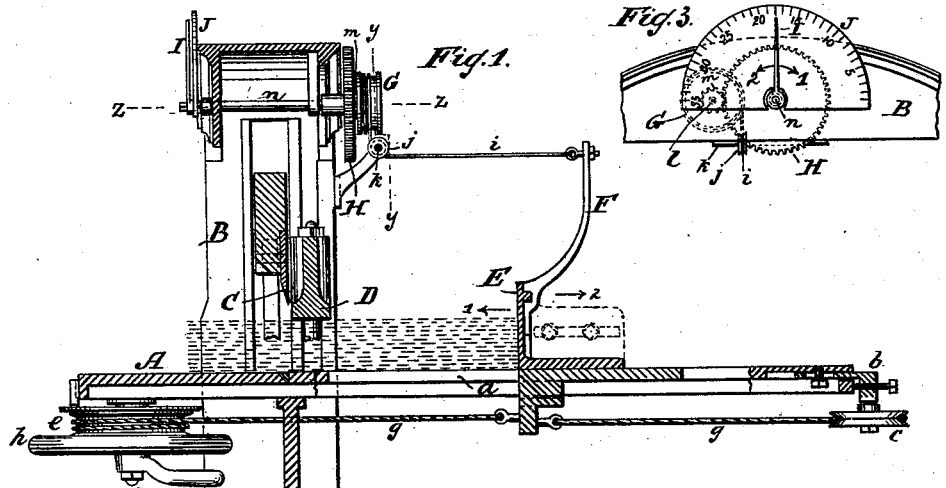
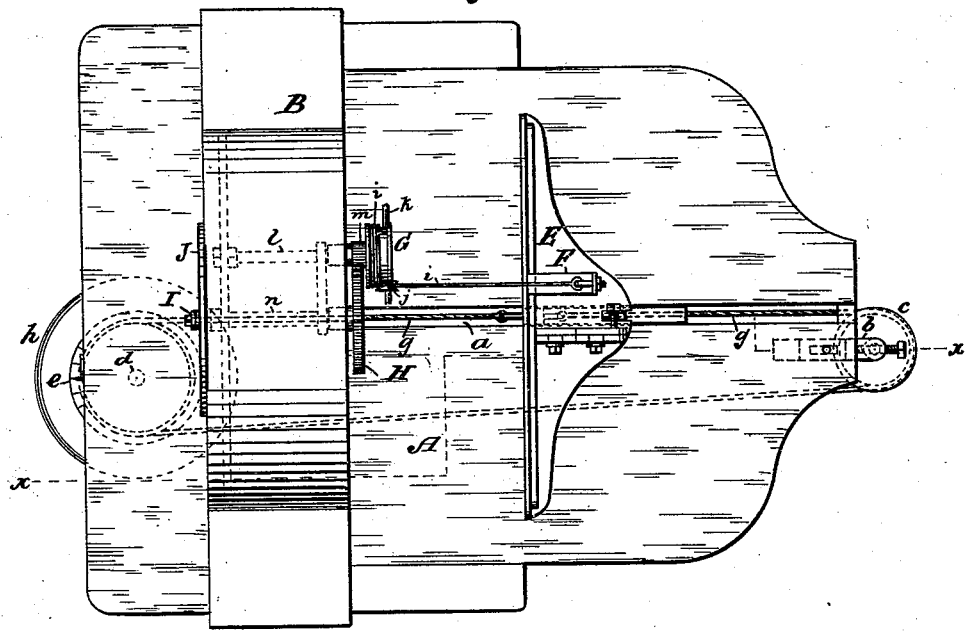
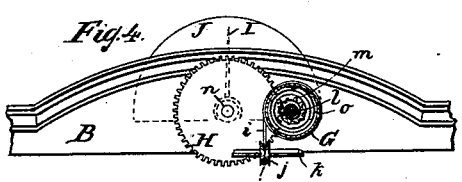
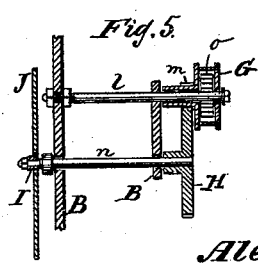
WITNESSES:
Edward Wolff.
William Miller
INVENTOR:
Alexander Malm.
BY
Van Santvoord & Hauff
his ATTORNEYS

UNITED STATES PATENT OFFICE.

ALEXANDER MALM, OF NEW YORK, N. Y., ASSIGNOR TO T. W. & C. B. SHERIDAN, OF SAME PLACE.

PAPER-CUTTING MACHINE.

SPECIFICATION forming part of Letters Patent No. 483,935, dated October 4, 1892.

Application filed July 23, 1891. Serial No. 400,388. (No model.)

*To all whom it may concern:*

Be it known that I, ALEXANDER MALM, a citizen of the United States, residing at New York, in the county and State of New York, have invented new and useful Improvements in Paper-Cutting Machines, of which the following is a specification.

The object of this invention is to facilitate the operation of adjusting the distance of the gage of a paper-cutting machine from the knife, the peculiar and novel means used for this purpose being pointed out in the following specification and claim and illustrated in the accompanying drawings, in which—

Figure 1 represents a longitudinal vertical section in the plane $x\,x$, Fig. 2. Fig. 2 is a plan or top view. Fig. 3 is a face view of the dial-plate and index. Fig. 4 is a vertical section in the plane $y\,y$, Fig. 1. Fig. 5 is a horizontal section in the plane $z\,z$, Fig. 1.

In the drawings the letter A designates the table of a paper-cutting machine which is supported by the frame B.

C is the knife, D the clamp, and E the gage. This gage rests upon the table A and is guided in a slot $a$ formed in said table. To the rear end of the table is secured a bracket $b$, which carries a pulley $c$, and in the table near its front end is secured a stud $d$, on which is mounted a pulley $e$ and a handle $f$, by means of which the pulley $e$ can be freely turned in either direction. From the gage E extends a rope $g$ round the pulleys $c$ and $e$ and back to the gage, so that when the pulley $e$ is turned in one direction the gage E is moved toward the knife C, and when the pulley $e$ is turned in the opposite direction the gage is moved away from the knife. These devices are in common use for adjusting the gage, and in order to ascertain the distance between the knife and the gage a disk $h$ is mounted upon the stud $d$, and on the upper face of this disk are marked figures which are intended to indicate the distance between the gage and the knife in inches. It is a well-known fact, however, that in many cases the figures on the disk $h$ are concealed by the pile of paper which projects beyond the front end of the table and in those cases the operator can ascertain the distance between the gage and the knife only by actual measurement with a rule.

By my invention a dial-plate is provided which is fixed in an upright position to the frame of the machine, so that it faces the operative, and which is provided with a scale to indicate the distance between the scale E and the knife C in inches. With this dial-plate is combined an index-hand which is geared with the back gage, so that the distance between the gage and the knife is clearly brought in view by the position of the index-hand in relation to the scale on the dial-plate. In order to effect this purpose I secure to the gage E an arm F, from which extends a rope $i$ round a pulley $j$ to a drum G, the pulley $j$ being mounted on a spindle $k$, which has its bearings in brackets secured to the frame B. The drum G is loosely mounted on the stationary arbor $l$, Figs. 2 and 5, and it carries a pinion $m$, which engages a cog-wheel H, mounted on an arbor $n$, which carries the index I. The rope $i$ passes several times round the drum G, and in the interior of this drum is situated a coiled spring $o$, one end of which is fastened to the drum and its other end to the stationary arbor $l$. The index I moves over a dial-plate J, which is secured to the front and top of the frame B, so that it is not liable to be concealed by the pile of paper to be cut, and that the operative in adjusting the gage has said index and dial-plate right before his eyes. When the gage E is moved in the direction of arrow 1, Fig. 1, the index I is turned in the direction of arrow 1, Fig. 3, the resiliency of the spring $o$ serving to turn the drum G in the proper direction for this purpose. If the gage is moved in the direction of arrow 2, Fig. 1, the index-hand I is moved in the direction of arrow 2, Fig. 3, and in this operation the rope $i$ turns the drum G in a direction which will rewind or place the spring $o$ under increased tension. The dial-plate J may be further utilized by placing on it the name of the manufacturer or other information which the manufacturer desires to keep before the eyes of his customers. It will be readily perceived that the dial-plate J can be made of such a diameter that a clear and distinct scale can be marked on the same and the entire scale is always in view of the operative, so that he can readily see the position of the index-hand and the adjustment of the gage can be effected without loss of time.

What I claim as new, and desire to secure by Letters Patent, is—

In a paper-cutting machine, the combination, with a table A, a knife C, a gage E, and means for moving the gage back and forth, of a dial-plate J, a movable index-hand I, having an arbor $n$, provided with a cog-wheel H, a rotating spring-drum G, having a pinion $m$, engaging the cog-wheel on the arbor of the index-hand, and a rope $i$, connected with the gage and winding on and uwinding from the spring-drum, substantially as described.

In testimony whereof I have hereunto set my hand in the presence of two subscribing witnesses.

ALEXANDER MALM.

Witnesses:
WM. C. HAUFF,
W. HAUFF.